Patented Dec. 19, 1939

2,184,078

UNITED STATES PATENT OFFICE 2,184,078

METHOD OF SINTERING FINELY DIVIDED FLUORSPAR

Reed W. Hyde, Summit, N. J.

No Drawing. Application September 22, 1938, Serial No. 231,163

5 Claims. (Cl. 75—5)

My invention relates to a process for sintering finely divided fluorspar, such as fluorspar concentrate, so as to produce sintered aggregates suitable for use in metallurgy.

Fluorspar is used as a flux in certain metallurgical operations as, for example, in the open hearth process of refining steel. Although fluorspar itself has a high melting point, it is very fluid when mixed with slag in an open hearth furnace, and renders the latter more liquid and thus facilitates the refining operation. At certain stages in the refining operation, therefore, the fluorspar is shoveled into the furnace on top of the molten charge where it melts, or is fused, by the slag and renders the latter liquid. For this purpose the fluorspar must be in coarse particles, that is, in particles of approximately ½ inch or ¾ inch size. A fine material such as flotation concentrate would blow out of the furnace and be lost, or would be of too small a particle size to sink into the molten charge.

Fluorspar concentrate, however, offers difficulties to sintering for the purpose of increasing its particle size. These difficulties are due to the physical character of the fluorspar concentrates which are of a "sandy" nature. Ordinary moistening and pelletizing processes are ineffective and the charge of concentrate would, therefore, make a dense bed on a sintering machine through which air could not be drawn at a rate sufficient to produce a sintering temperature. This condition is aggravated by the fact that fluorspar has a relatively high fusion temperature so that a higher sintering temperature is required than in the sintering of ordinary materials. Owing to the sandy character of the fluorspar, any pellets formed solely of fluorspar in a pelletizing machine break down as soon as the charge is exposed to the ignition heat, thus destroying the permeability given to the charge by pelletizing.

In my present invention these difficulties are overcome by forming the fluorspar concentrates into pellets by means of a plastic bonding material which is sufficiently stable during the sintering operation to maintain the pellets of fluorspar concentrates against breakdown until sintered, and which is neutral or unobjectionable in the later metallurgical operations.

In my invention I admix with the fluorspar concentrates, either during or previous to pelletizing, a small quantity of an inorganic bonding material of plastic nature. Such a bonding agent may, for example, be freshly hydrated lime (fresh mason's hydrate), ferrous hydrate, or some ferrous salt, which will form ferrous hydrate in alkaline solution, plaster of Paris, sodium silicate, clay or similar plastics, or any hydrated metal compound compatible with the metallurgical operations in which the fluorspar is to be employed, and having plastic properties such as those of lime or ferrous hydrate. The amount of material thus added may amount, for example, to 5% of the total quantity of fluorspar. During the pelletizing operation in which the fluorspar and the plastic bonding agent in a moistened condition are admixed and tumbled about or otherwise subdivided into pellets, the action of the bonding agent is primarily mechanical, serving to bond and hold the finely divided particles of fluorspar in stable pellet form. A small quantity of fuel may be added either admixed in the interior of the pellets or as a surface coating. This fuel will also be in finely divided condition as, for example, coke breeze or powdered or finely divided coal. In forming the pellets, returns may be employed as is customary in sintering operations.

The pellets are then laid in a bed on a sintering machine to a suitable thickness as, for example, from about 5 inches to 8 inches, and burned with a strong blast of air. As is usual in sintering operations, a down blast of air is used. During the sintering operation the cementing or bonding material may combine or flux with the fluorspar. In the event that lime is employed, the lime will be available for fluxing purposes in the later metallurgical operation. In the event that iron oxide, such as that produced from ferrous sulphate or mill scale, is employed it may also flux with the fluorspar during the sintering, or with impurities such as lime or silica contained in the fluorspar. Inasmuch as the fluorspar is to be used in steel making, the iron oxide thus added may be reduced in the open hearth furnace and replaced by silica or other slag material.

Examples of my invention are as follows:

Example I

Fluorspar concentrate, containing 98% $CaF_2$, and of the following size—

| | Per cent |
|---|---|
| Minus 40 plus 60 mesh | 6.8 |
| Minus 60 plus 80 mesh | 7.7 |
| Minus 80 plus 100 mesh | 19.3 |
| Minus 100 mesh | 66.2 |
| | 100.0 | was mixed with 10% of coke breeze, moistened and mixed in a pelletizer mixer with 5% of freshly hydrated lime and formed into pellets. It was then charged into a sintering machine on a bed of 5½ inches depth. When ignited and burned with a down draft of air, an excellent sintered product was obtained in about 15 minutes.

*Example II*

100 pounds of fluorspar concentrate of the characteristics described in Example I were mixed with 5 pounds of ferrous sulphate crystals, 2 pounds of freshly hydrated lime and 10 pounds of coke, then moistened and pelletized to form pellets, and sintered on a sintering machine in a bed of 5 inches depth. It ignited readily and sintered in about 10 minutes to an excellent sintered product.

*Example III*

Fluorspar concentrate such as described in Example I was mixed with freshly hydrated lime (mason's hydrate), iron oxide and return sinter fines in the following proportions—

| | Pounds |
|---|---|
| Fluorspar concentrate | 100 |
| Mason's hydrate | 5 |
| Iron oxide (fine ore) | 5 |
| Return sinter fines | 40 |
| Coke | 10 |

The mixture was then moistened and pelletized and sintered on a sintering machine as described above. It ignited readily and made an excellent sintered product in about 15 minutes burning time.

The term "pellets" as used herein is not limited to rounded particles or nodules only, but is meant to include also small irregularly shaped masses composed of a number of fine individual particles bonded lightly together in such form that a mass of the pellets, when charged on a sintering machine, will form a bed with interstices between the pellets through which gases may be caused to flow readily.

What I claim is—

1. A process of sintering fluorspar which comprises admixing finely divided fluorspar with a moistened inorganic plastic cementing material, forming the mixture into pellets, and sintering said pellets in a shallow bed with a down blast of air.

2. A process of sintering fluorspar which comprises admixing finely divided fluorspar with freshly hydrated lime, forming the mixture into pellets, and sintering the pellets in a shallow bed with a down blast of air.

3. A process of sintering fluorspar which comprises admixing finely divided fluorspar with plastic iron compounds, forming the mixture into pellets, and sintering the pellets in a shallow bed with a down blast of air.

4. A process of sintering finely divided fluorspar which comprises admixing with said fluorspar an inorganic, moistened, plastic cementing material and fuel, forming the mixture into pellets, and sintering in a shallow bed with a down blast of air.

5. A process of sintering finely divided fluorspar which comprises admixing with said fluorspar about 5% of a plastic, inorganic, cementing material and about 10% of fuel, forming the mixture into pellets, and sintering in a bed between five inches and eight inches deep with a down blast of air.

REED W. HYDE.